(12) United States Patent
Komorida et al.

(10) Patent No.: US 11,543,829 B2
(45) Date of Patent: Jan. 3, 2023

(54) WORK VEHICLE AND BASE STATION

(71) Applicant: Kubota Corporation, Osaka (JP)

(72) Inventors: Takeshi Komorida, Sakai (JP); Hitoshi Aoyama, Sakai (JP); Hideya Umemoto, Sakai (JP); Katsuhiko Uemura, Sakai (JP); Kentaro Shinkai, Sakai (JP); Shinichi Yamada, Sakai (JP); Kanako Komori, Sakai (JP); Kensuke Uemoto, Sakai (JP)

(73) Assignee: Kubota Corporation, Osaka (JP)

(*) Notice: Subject to any disclaimer, the term of this patent is extended or adjusted under 35 U.S.C. 154(b) by 620 days.

(21) Appl. No.: 16/432,007

(22) Filed: Jun. 5, 2019

(65) Prior Publication Data
US 2019/0391589 A1 Dec. 26, 2019

(30) Foreign Application Priority Data

Jun. 21, 2018 (JP) .............................. JP2018-118114
Jun. 21, 2018 (JP) .............................. JP2018-118115
Jun. 21, 2018 (JP) .............................. JP2018-118116

(51) Int. Cl.
*G05D 1/02* (2020.01)
*B60L 53/65* (2019.01)
(Continued)

(52) U.S. Cl.
CPC ......... *G05D 1/0225* (2013.01); *A01D 34/003* (2013.01); *A01D 34/008* (2013.01); *B08B 3/02* (2013.01); *B60L 53/65* (2019.02); *G05D 1/0088* (2013.01); *G05D 1/0246* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

2010/0007459 A1 1/2010 Manita et al.
2010/0010698 A1 1/2010 Iwashita et al.
(Continued)

FOREIGN PATENT DOCUMENTS

DE 102013215195 A1 2/2015
EP 2437132 A1 4/2012
(Continued)

OTHER PUBLICATIONS

"Journal of the Japan Society for Precision Engineering", 2017, pp. 116-120, vol. 83:2, (Partial translation included, 2 pages).

*Primary Examiner* — Adam D Tissot
*Assistant Examiner* — Garrett F Evans
(74) *Attorney, Agent, or Firm* — The Webb Law Firm

(57) ABSTRACT

A work vehicle comprising: a drive wheel unit that is provided in a vehicle body and is configured to be driven by a travel drive mechanism; a work unit that is provided in the vehicle body and is configured to perform work on a work target; a battery provided in the vehicle body; a motor that is configured to receive electric power from the battery and drive the work unit; an inclination sensor configured to detect an inclination of the vehicle body relative to a horizontal plane; and a first captured image acquisition unit configured to acquire a captured image that shows surroundings of the vehicle body when the work is being performed.

4 Claims, 8 Drawing Sheets

(51) Int. Cl.
  *A01D 34/00* (2006.01)
  *B08B 3/02* (2006.01)
  *G05D 1/00* (2006.01)
  *A01D 101/00* (2006.01)

(56) References Cited

U.S. PATENT DOCUMENTS

| | | | |
|---|---|---|---|
| 2011/0185975 A1* | 8/2011 | Van Den Berg | A01K 1/105 15/93.1 |
| 2012/0049785 A1 | 3/2012 | Tanaka | |
| 2012/0083963 A1 | 4/2012 | Sato et al. | |
| 2013/0211645 A1 | 8/2013 | Yamamura et al. | |
| 2014/0048104 A1 | 2/2014 | Stadler | |
| 2015/0198936 A1 | 7/2015 | McGee et al. | |
| 2015/0348335 A1 | 12/2015 | Ramanujam | |
| 2016/0375862 A1 | 12/2016 | Ito et al. | |
| 2018/0024563 A1 | 1/2018 | Matsuzaki et al. | |
| 2018/0077860 A1 | 3/2018 | Einecke et al. | |
| 2019/0039571 A1 | 2/2019 | Shimizu | |
| 2019/0147715 A1* | 5/2019 | Noras | G08B 15/00 701/22 |
| 2019/0265725 A1* | 8/2019 | Shao | G05D 1/0278 |
| 2019/0315314 A1* | 10/2019 | Haneda | G05D 1/0094 |

FOREIGN PATENT DOCUMENTS

| | | |
|---|---|---|
| EP | 2698293 A2 | 2/2014 |
| EP | 3045996 A1 | 7/2016 |
| EP | 3067771 A1 | 9/2019 |
| JP | 2004142070 A | 5/2004 |
| JP | 200611728 A | 1/2006 |
| JP | 2006260105 A | 9/2006 |
| JP | 201017129 A | 1/2010 |
| JP | 201279023 A | 4/2012 |
| JP | 2013133010 A | 7/2013 |
| JP | 2013164741 A | 8/2013 |
| JP | 2016120583 A | 7/2016 |
| JP | 201813833 A | 1/2018 |
| JP | 201842528 A | 3/2018 |
| WO | 2016097892 A1 | 6/2016 |
| WO | 2017138345 A1 | 8/2017 |
| WO | 2018086612 A1 | 5/2018 |

* cited by examiner

WORK VEHICLE AND BASE STATION

CROSS-REFERENCE TO RELATED APPLICATIONS

This application claims priority to Japanese Patent Application Nos. 2018-118114, 2018-118115, and 2018-118116 filed Jun. 21, 2018, the disclosures of which are hereby incorporated by reference in their entirety.

BACKGROUND OF THE INVENTION

Field of the Invention

The present invention relates to a work vehicle and a base station.

Description of the Related Art

Technology for allow vehicles to travel autonomously has conventionally been used. One example of such an autonomously traveling vehicle is a work vehicle capable of unmanned travel while performing predetermined work (e.g., lawn mowing) in a large field or the like. As an example of this type of technology, JP 2013-164741A discloses an unmanned traveling work vehicle that includes an electric motor that is provided in a vehicle body and receives power from a battery, and also includes an engine that is provided in the vehicle body. The unmanned traveling work vehicle travels in a work area by driving wheels with the engine, and performs work by using the electric motor to drive a work device that is provided in the vehicle body. With this conventional technology, work is performed by driving the work device that is provided in the vehicle body. However, when the work is lawn mowing for example, the work vehicle sometimes performs the work in a location that is not visible to the user, and also sometimes performs the work while the user is not in the surrounding area. There is also the possibility that the work site includes a hill that hinders the traveling of the work vehicle, and also the possibility that, if the user is not nearby, the work vehicle will not be able to travel over the hill and will not be able to continue traveling. In view of this, there is desire for a work vehicle that can avoid a situation in which the work vehicle is not able to continue traveling.

An autonomously traveling work vehicle sometimes performs work in a location that is not visible to the user, and also sometimes performs the work while the user is not in the surrounding area. For this reason, there is a possibility that the work vehicle will be stolen. In view of this, technology for suppressing theft has been developed, as disclosed in JP 2010-17129A for example. A theft prevention device disclosed in this conventional technology includes an electronic key that stores authentication data and can be carried by an operator, and an authentication means that is provided in the work device and performs authentication regarding whether or not the electronic key is an authorized key with use of pre-stored verification data when authentication data is output from the electronic key. The authentication means stops the running of the vehicle if it is determined that the electronic key is not an authorized key. This conventional technology makes it possible to prevent the vehicle from being run by an operator (user) who does not have the electronic key. However, no action whatsoever is taken against a suspicious person, and therefore this conventional technology cannot reliably prevent theft. In view of this, there is desire for a work vehicle that is resistant to theft.

An unmanned traveling work vehicle disclosed in JP 2013-164741A includes an electric motor that is provided in a vehicle body and receives power from a battery, and also includes an engine that is provided in the vehicle body. This unmanned traveling work vehicle travels in a work area by driving wheels with the engine, and performs work by using the electric motor to drive a work device that is provided in the vehicle body. In this unmanned traveling work vehicle (work vehicle), the work device is provided on the side of the vehicle body that faces the work surface (i.e., the bottom side). For this reason, the user cannot easily perform maintenance on the work device. Also, work is sometimes performed in a location that is not visible to the user, and also sometimes the work is performed while the user is not in the surrounding area. For this reason, the user cannot easily be aware of the state of the work device. In view of this, there is desire for a base station that enables the maintenance of a work vehicle to be performed easily.

SUMMARY OF THE INVENTION

A work vehicle according to one aspect of the present invention is a work vehicle that performs work while traveling autonomously, comprises:

a drive wheel unit that is provided in a vehicle body and is configured to be driven by a travel drive mechanism;

a work unit that is provided in the vehicle body and is configured to perform work on a work target;

a battery provided in the vehicle body;

a motor that is configured to receive electric power from the battery and drive the work unit;

an inclination sensor configured to detect an inclination of the vehicle body relative to a horizontal plane;

a first captured image acquisition unit configured to acquire a captured image that shows surroundings of the vehicle body when the work is being performed;

a first determination unit configured to determine whether or not the work can be continued while traveling autonomously, based on at least one of a detection result from the inclination sensor and the captured image; and a stop unit configured to stop driving of the drive wheel unit in a case where the first determination unit determined that the work cannot be continued.

According to this configuration, if it is determined that the autonomously traveling work vehicle cannot continue to travel, it is possible to stop the autonomous traveling of the work vehicle. Accordingly, it is possible to avoid a case where the work vehicle cannot continue to travel.

Also, by avoiding the entrance of the work vehicle into a region that cannot be traveled, and avoiding a situation in which the work vehicle cannot travel, it is possible to prevent units of the work vehicle from malfunctioning or becoming damaged.

In the above arrangement, preferably, the first determination unit determines that the work cannot be continued in a case where the inclination of the vehicle body detected by the inclination sensor is greater than or equal to a preset value.

According to this configuration, the work vehicle can be immediately stopped if unintended movement of the work vehicle is detected.

In the above arrangement, preferably, the first determination unit determines that the work cannot be continued in a case where a distance to an object included in the captured image acquired by the first captured image acquisition unit is less than or equal to a preset value.

According to this configuration, it is possible to recognize an obstacle in the periphery of the work vehicle and automatically avoid collision with the obstacle.

In the above arrangement, preferably, the first determination unit calculates a gradient of a predicted travel region located ahead in a traveling direction based on the captured image acquired by the first captured image acquisition unit, and determines that the work cannot be continued in a case where the gradient is greater than or equal to a preset value.

According to this configuration, if the gradient ahead of the work vehicle is steep for example, it is possible to the prevent the work vehicle from entering the steep gradient region. Accordingly, it is possible to prevent the work vehicle from becoming stuck or overturning.

It is preferable that the above configuration further comprises:

a battery identification information acquisition unit configured to acquire preset identification information from a charging device configured to charge only the battery that has the preset identification information;

an identification information determination unit configured to determine whether or not the preset identification information acquired by the battery identification information acquisition unit matches identification information of the battery provided in the vehicle body; and a permission unit that permits charging of the battery in a case where the identification information determination unit determined that the preset identification information matches the identification information of the battery provided in the vehicle body, wherein the charging device is provided in a base station to which the vehicle body returns while traveling autonomously.

According to this configuration, charging of the battery can be prevented if the charging device and the battery are not in correspondence with each other. Accordingly, even if the work vehicle is stolen, it is possible to prevent the battery from being charged at the thief's destination. Also, according to this configuration, authentication between the charging device and the battery can be performed automatically without involvement of the user.

A work vehicle according to another aspect of the present invention is work vehicle that performs work while traveling autonomously, comprises:

an object detection unit configured to detect an object located in a periphery of a vehicle body;

an identification information acquisition unit configured to acquire identification information that is transmitted from a transmission unit of a terminal in possession of a user to the periphery;

a second determination unit configured to determine whether or not the identification information acquisition unit acquired preset identification information that is associated with the vehicle body; and an indication unit configured to give an indication that the object is approaching the vehicle body in a case where the identification information acquisition unit determined that the preset identification information has not been acquired and furthermore a distance from the vehicle body to the object is within a preset distance.

According to this configuration, it is possible to give an indication that a suspicious person has approached the work vehicle. For example, it is possible to give a warning to the suspicious person by making the suspicious person aware of the indication, and it is possible to stop the suspicious person from approaching the work vehicle even if the user is not near the work vehicle. Also, by making the user aware of the indication, it is possible to prompt the user to be cautious of the region including the work vehicle. According to this configuration, it is possible to prevent theft of the work vehicle.

It is preferable that the above configuration further comprises:

a contact sensor that is provided in the vehicle body and is configured to detect contact by the object; and an electric shock application unit configured to apply an electric shock to the object that is in contact with the vehicle body in a case where the indication unit gave the indication and furthermore the contact sensor detected that the object is in contact with the vehicle body.

According to this configuration, if a person ignores the indication given by the indication unit and touches the work vehicle, it is possible to further give a warning. Accordingly, it is possible further enhance the theft prevention effect.

It is preferable that the above configuration further comprises:

a base station periphery captured image acquisition unit that is provided at a location separated from a base station to which the work vehicle returns while traveling autonomously, and is configured to acquire a captured image that shows surroundings of the base station;

an image determination unit configured to determine whether or not the object is included in the captured image acquired by the base station periphery captured image acquisition unit; and a transmission unit configured to transmit, to the terminal of the user, information indicating that there is an object approaching the vehicle body in a case where the image determination unit determined that the object is included in the captured image and furthermore the indication unit gave the indication.

According to this configuration, even if the user is not near the work vehicle, it is possible to monitor the work vehicle and the base station, and to notify the user (give a warning notification to the user) that an object is approaching the base station. For example, if the user checks the base station upon receiving the notification, it is possible to prevent disadvantageous situations such as the work vehicle being stolen or the work vehicle or the base station becoming damaged.

It is preferable that the above configuration further comprises:

a vehicle body periphery captured image acquisition unit configured to acquire a captured image that shows surroundings of the vehicle body;

a specification unit configured to specify an object approaching the vehicle body based on the captured image acquired by the vehicle body periphery captured image acquisition unit; and an output unit configured to output a retreat sound for causing the object to retreat, based on the specified object.

According to this configuration, it is possible to specify the object that is approaching the work vehicle and to output a sound that is disliked by the object in order to cause the object to retreat. Accordingly, it is possible to prevent a careless accident such as collision between the work vehicle and the object.

It is preferable that the above configuration further comprises:

a work unit that is provided in the vehicle body and is configured to perform work on a work target;

wherein the retreat sound is generated with use of an operation sound produced during operation of the work unit.

According to this configuration, there is no need to provide a separate unit for producing sound. Accordingly, it is possible to realize a low cost and to prevent the harmful influence of an increase in weight.

A base station according to an aspect of the present invention is a base station to which a work vehicle returns after the work vehicle performs work while traveling autonomously, comprises:

at least one shower unit configured to spray water onto a work unit that is provided in the work vehicle and performs work on a work target;

at least one air blower unit configured to blow air onto the work unit after the shower unit sprays water;

a return detection unit configured to detect a return of the work vehicle; and a control unit configured to perform control such that the work unit is immediately cleaned by operation of the shower unit and the air blower unit when the return detection unit detects the return of the work vehicle.

According to this configuration, the work unit can be automatically cleaned without human assistance when the work vehicle has returned to the base station. Accordingly, it is possible to always keep the work unit in a clean state, thus making it possible to maintain high performance for the work unit. Also, according to this configuration, after being shower washed, the water is blown away by the air blower, thus making it possible to maintain water resistance. According to this configuration, it is possible to easily perform maintenance of the work vehicle.

It is preferable that the above configuration further comprises:

a second captured image acquisition unit configured to acquire a captured image that shows the work unit of the work vehicle after returning;

a diagnosis unit configured to determine a constituent component of the work unit that requires replacement, based on the captured image acquired by the second captured image acquisition unit; and an announcement unit configured to announce a determination result from the diagnosis unit to a user.

According to this configuration, it is possible to specify a constituent component of the work unit that requires maintenance through image diagnosis, and to automatically alert the user when the component has been replaced. Accordingly, it is possible to eliminate this management burden on the user.

It is preferable that the above configuration further comprises:

a storage unit configured to store a constituent component of the work unit;

a removal unit configured to remove the component determined to require replacement by the diagnosis unit from the work unit;

a transport unit configured to transport the removed component to the storage unit and also transport a component that is to replace the removed component from the storage unit to the work unit; and an attachment unit configured to attach the component transported from the storage unit to the work unit.

According to this configuration, it is possible to automatically determine when a constituent component of the work unit is to be replaced, and to replace the component without requiring the user to check the component. Accordingly, it is possible to replace the component at an appropriate replacement timing even if the user does not have knowledge or experience. Also, in the case where a screw is used in component replacement, the tightening of the screw is mechanized, thus making it possible to maintain a constant tightening torque.

In the above arrangement, preferably, the announcement unit also announces, to the user, replacement information indicating that the component of the work unit was replaced.

According to this configuration, it is possible to inform the user that the component was replaced. Accordingly, the user need only storing a new replacement component in the storage unit and removing worn component replacement, thus making it possible to reduce the burden on the user.

DETAILED DESCRIPTION OF THE PREFERRED EMBODIMENTS

The following describes a work vehicle that performs work on a work target while traveling autonomously, and in the following example, the work performed by the work vehicle is lawn mowing. Here, "autonomous travel" in the present embodiment refers to traveling while avoiding objects (e.g., obstacles) along a traveling path that has been set based on output from a device included in the work vehicle (e.g., based on output from sensors and captured images from a camera). Such a work vehicle corresponds to a so-called autonomous robot.

Figure 1:
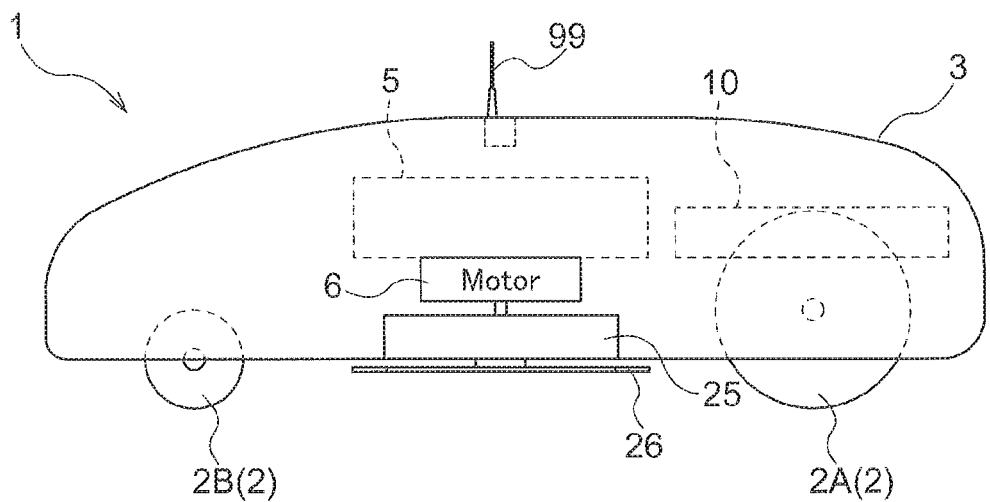
FIG. 1 is a side view of a work vehicle.
Figure 2:
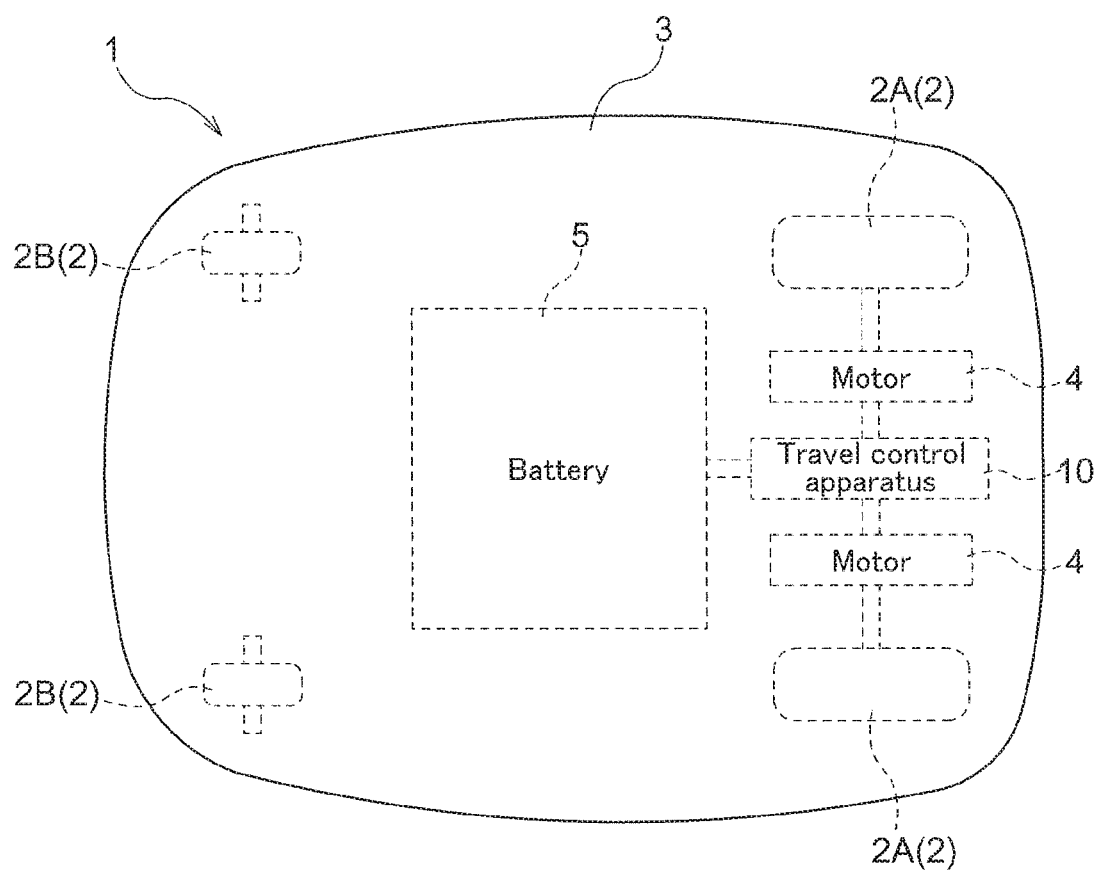
FIG. 2 is a plan view of the work vehicle.

FIG. 1 shows a side view of a work vehicle 1 according to the present embodiment, and FIG. 2 shows a plan view of the work vehicle 1. As shown in FIGS. 1 and 2, the work vehicle 1 includes wheels 2 and a chassis 3 (vehicle body). The wheels 2 include a pair of left and right first wheels 2A (one example of a drive wheel unit) on one end side in the vehicle length direction of the vehicle body, and a pair of left and right second wheels 2B on the other end side in the vehicle length direction. Pairs of one first wheel 2A and one second wheel 2B are respectively provided on the left and right sides with respect to the width direction of the vehicle body. In the present embodiment, the first wheels 2A are configured as wheels that are for driving and steering and are provided on the rear side in the traveling direction of the work vehicle 1, and are driven by a later-described travel control apparatus 10. The second wheels 2B are configured as so-called caster wheels that are provided on the front side in the traveling direction of the work vehicle 1. Accordingly, when the left and right first wheels 2A rotate in the same direction at the same speed, the work vehicle 1 travels forward. Also, when the left and right first wheels 2A rotate in the same direction at mutually different speeds, the work vehicle 1 turns toward the side corresponding to whichever one of the left and right first wheels 2A has the slower speed. Furthermore, when the left and right first wheels 2A rotate in mutually different directions at the same speed, the work vehicle 1 rotates in place. Note that although it has been described that pairs of one first wheel 2A and one second wheel 2B are respectively provided on the left and right sides with respect to the width direction of the vehicle body, this is merely an example. For example, the number of first wheels 2A may be different from the number of second wheels 2B depending on the size of the vehicle body, and the number of each type of wheel may be one or three or more.

The chassis 3 includes a pair of motors 4, a battery 5, the travel control apparatus 10 (one example of a travel drive mechanism), and a motor 6. The pair of motors 4 are motive power sources for the first wheels 2A. The battery 5 accumulates electric power, and the electric power in the battery 5 is supplied to motors 4 and electrical devices in the work vehicle 1. The travel control apparatus 10 controls the traveling of the work vehicle 1. The motor 6 drives a mowing apparatus 25 (one example of a work unit). The mowing apparatus 25 has a mowing blade 26 used for mowing, and the mowing blade 26 is driven with use of electric power supplied from the battery 5.

Also, the chassis 3 is provided with a satellite positioning module 99 that is configured as a GNSS module. The satellite positioning module 99 has a satellite antenna for receiving GPS signals or GNSS signals (GPS signals are assumed in the present embodiment). Note that in order to complement satellite navigation, the satellite positioning module 99 can include an inertial navigation module that has built-in gyroscopic acceleration sensors and magnetic direction sensors. Of course, the inertial navigation module may be provided in a separate location from the satellite positioning module 99. GPS signals acquired by the satellite positioning module 99 are used in the autonomous traveling of the work vehicle 1 described above.

First Embodiment

Figure 3:
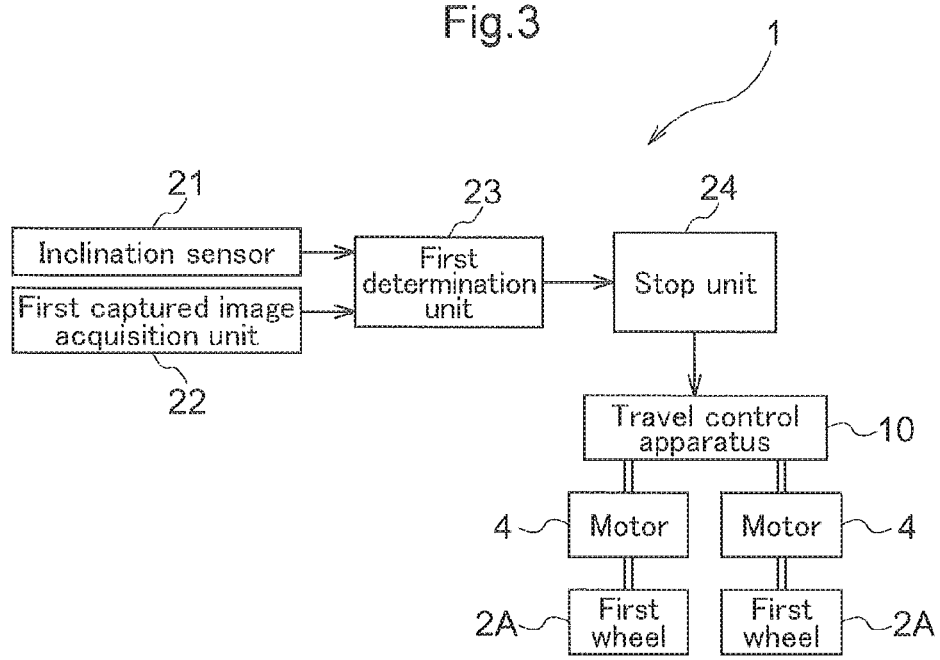
FIG. 3 is a block diagram schematically showing a configuration of relevant portions of the work vehicle.

The work vehicle 1 according to the present invention is configured to be capable of avoiding the case where traveling cannot be continued. FIG. 3 is a block diagram schematically showing the configuration of relevant portions of the work vehicle 1 of the first embodiment. The work vehicle 1 includes function units such as an inclination sensor 21, a first captured image acquisition unit 22, a first determination unit 23, and a stop unit 24. For performing various types of processing pertaining to controlling the traveling of the work vehicle 1, these function units are constructed from hardware including a CPU as a central member, are constructed from software, or are constructed from both. Note that the travel control apparatus 10, the motors 4, and the first wheels 2A described above are also shown in FIG. 3.

The inclination sensor 21 detects inclination of the vehicle body relative to the horizontal plane when the work vehicle 1 is performing work on a work target. In the first embodiment, the work is lawn mowing. Inclination of the vehicle body relative to the horizontal plane refers to the extent to which the vehicle body is inclined relative to the horizontal plane. Accordingly, the inclination sensor 21 detects the extent of inclination of the vehicle body during lawn mowing. It is preferable that the inclination sensor 21 includes a known acceleration sensor, for example. Detection results from the inclination sensor 21 are transmitted to the later-described first determination unit 23.

The first captured image acquisition unit 22 acquires captured images showing the surroundings of the vehicle body when the work vehicle 1 performs work on the work target. The captured images showing the surroundings of the vehicle body are images that show the periphery as viewed from the work vehicle 1. For example, a configuration is possible in which cameras are provided in the front end portion, the rear end portion, and the left and right side end portions of the work vehicle 1, and the captured images are acquired from such cameras. Of course, a configuration is possible in which the work vehicle 1 is provided with only one camera. The captured images may be still images, or may be moving images. The captured images acquired by the first captured image acquisition unit 22 are transmitted to the later-described first determination unit 23.

The first determination unit 23 determines whether or not work can continue to be performed on the work target while traveling autonomously, based on at least either detection results from the inclination sensor 21 or captured images. The detection results from the inclination sensor 21 are the results of detection of the inclination of the vehicle body relative to the horizontal plane by the inclination sensor 21. The captured images are images that were acquired by the first captured image acquisition unit 22 and that show the surroundings of the vehicle body. The determination made by the first determination unit 23 is made based on at least either the results of detection of the inclination of the vehicle body relative to the horizontal plane by the inclination sensor 21 or the images that were acquired by the first captured image acquisition unit 22 and that show the surroundings of the vehicle body.

Figure 4:
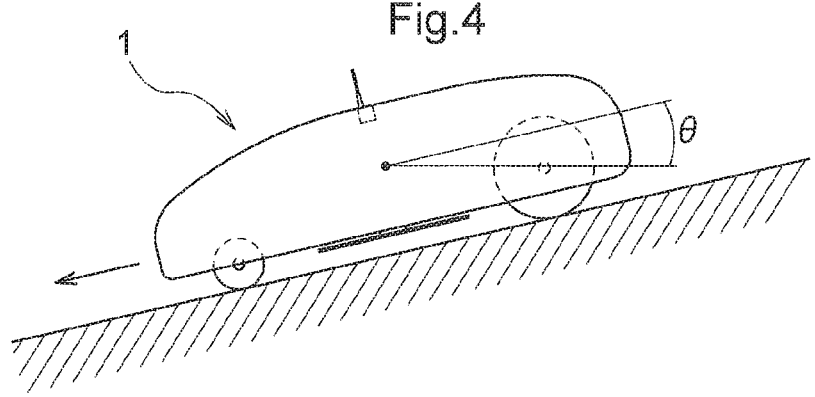
FIG. 4 is a diagram showing an example of a determination made by a determination unit.

It is preferable that the first determination unit 23 determines that work cannot continue to be performed on the work target in the case where the inclination of the vehicle body detected by the inclination sensor 21 is greater than or equal to a preset value. The "preset value" may be set based on the value at which traveling of the work vehicle 1 becomes difficult due to inclination of the vehicle body relative to the horizontal plane. Specifically, as shown in FIG. 4 for example, the first determination unit 23 may determine that the traveling of the work vehicle 1 becomes difficult in the case where the inclination of the vehicle body relative to the horizontal plane has reached a predetermined angle θ. This therefore prevents the risk of overturning of the work vehicle 1.

Figure 5:
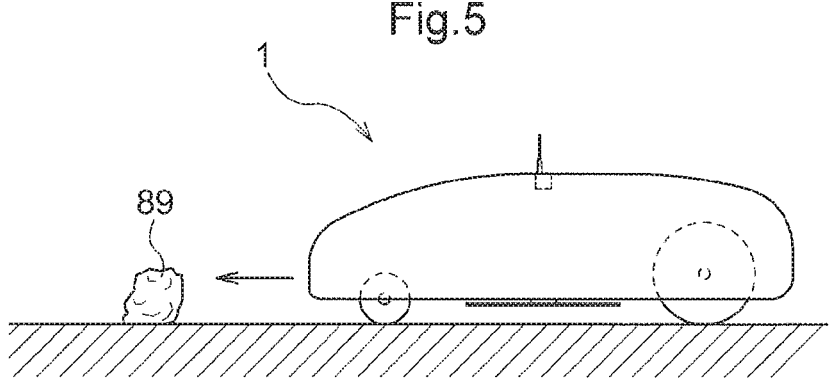
FIG. 5 is a diagram showing an example of a determination made by the determination unit.

The first determination unit 23 can also determine that work cannot continue to be performed on the work target in the case where the distance to an object included in a captured image acquired by the first captured image acquisition unit 22 is less than or equal to a preset value. The object included in the captured images may be a moving object or a still object, and firstly, the first determination unit 23 uses known image recognition processing to determine whether or not such an object is included in a captured image acquired by the first captured image acquisition unit 22. A configuration is possible in which in the case where it is determined that an object is included in a captured image, the distance between the object and the work vehicle 1 is then calculated. Accordingly, in the case where a rock 89 or the like is located ahead in the traveling direction of the work vehicle 1 as shown in FIG. 5, it is possible to stop the work vehicle 1 at a position that is a predetermined distance ahead of the object.

Figure 6:
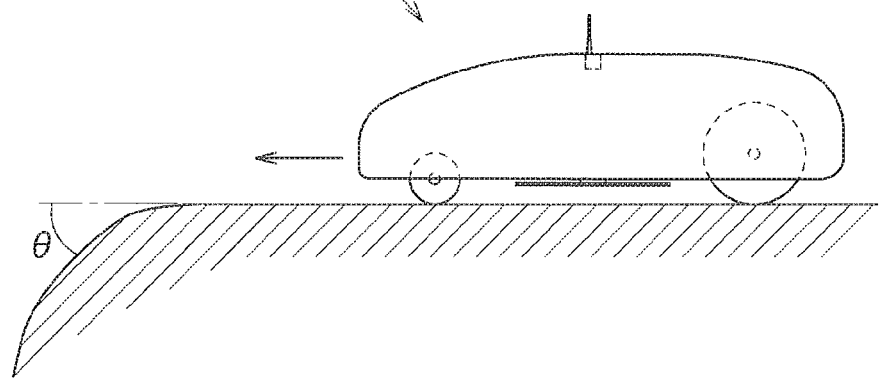
FIG. 6 is a diagram showing an example of a determination made by the determination unit.

Returning to FIG. 3, furthermore, a configuration is possible in which the first determination unit 23 calculates the gradient of a predicted travel region located ahead in the traveling direction based on a captured image acquired by the first captured image acquisition unit 22, and determines that work cannot continue to be performed on the work target in the case where the gradient is greater than or equal to a preset value. The gradient of the predicted travel region located ahead in the traveling direction is the inclination, relative to the horizontal plane, of the work site that is shown in the captured image, in which the work vehicle 1 is predicted to travel. The gradient can be calculated using known image recognition processing. As described above, the "preset value" may be set based on the value at which traveling of the work vehicle 1 becomes difficult due to inclination of the vehicle body relative to the horizontal plane. Accordingly, it is possible to avoid a situation in which, as shown in FIG. 6, the work vehicle 1 stops before entering a steep-gradient region, and the work vehicle 1 can no longer travel due to excessive inclination of the vehicle body. Such a determination result from the first determination unit 23 is transmitted to the later-described stop unit 24.

The stop unit 24 stops the driving of the first wheels 2A in the case where the first determination unit 23 determined that work cannot continue to be performed on the work target. The determination result from the first determination unit 23 is the result of a determination made based on at least either a detection result from the inclination sensor 21 or a captured image captured by the first captured image acquisition unit 22 as previously described. In the case where a determination resulting indicating that the work vehicle 1 will not be able to continue traveling while performing lawn mowing is received from the first determination unit 23, the stop unit 24 instructs the travel control apparatus 10 to stop the driving of the motors 4. In accordance with this instruction, the motors 4 stop, and the first wheels 2A stop. Accordingly, the work vehicle 1 can be stopped in place.

Note that when the work vehicle 1 stops, operations may be put on hold until the user comes, and a configuration is possible in which a travelable direction is determined based on a captured image, and the work vehicle 1 travels in the determined direction.

Here, the work vehicle 1 performs lawn mowing while traveling autonomously, and it is configured so as to depart from a base station 100 (see FIG. 7) at a work start time and return to the base station 100 after work ends. The work vehicle 1 is configured such that the battery 5 can be charged at the base station 100. The charging of the battery 5 will be described below.

Figure 7:
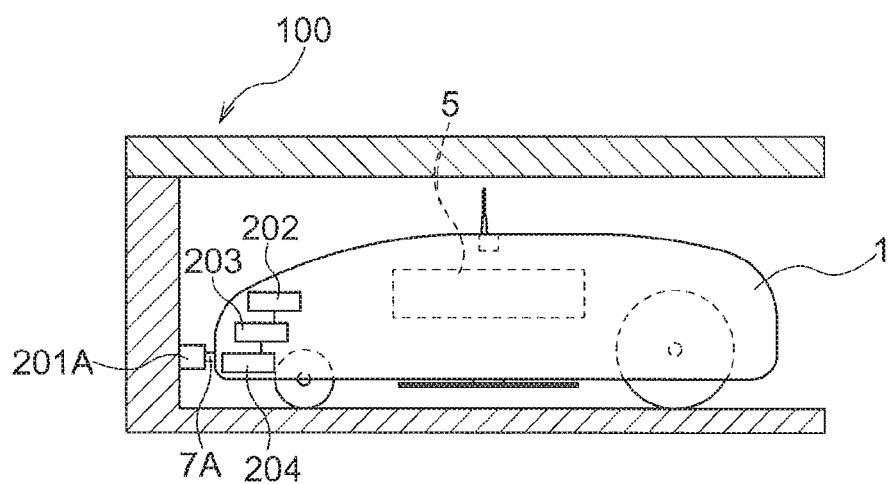
FIG. 7 is a diagram illustrating battery charging.

As shown in FIG. 7, a charging device 201A capable of charging the battery 5 is provided at the base station 100 to which the work vehicle 1 autonomously returns. A configuration is preferable in which the front end portion of the work vehicle 1 is provided with a connection terminal 7A capable of being connected to a terminal of the charging device 201A, and the terminal of the charging device 201A and the connection terminal 7A become fitted to each other when the work vehicle 1 moves into and parks in the base station 100.

In the first embodiment, the battery 5 is provided in the work vehicle 1, and unique identification information (e.g., an identification number) is set in the battery 5 in advance. The charging device 201A is not configured to be capable of being charged by any battery 5, but rather is configured to capable of being charged by only the battery 5 that has preset identification information. Specifically, a configuration is possible in which unique identification information is stored in the battery 5, and identification information of the battery 5 that can charge the charging device 201A is stored in the charging device 201A.

In the first embodiment, a battery identification information acquisition unit 202 is provided in the work vehicle 1. Identification information of a battery 5 that can charge the charging device 201A is stored in the charging device 201A, and the battery identification information acquisition unit 202 acquires this battery 5 identification information from the charging device 201A. The acquired identification information is transmitted to a later-described identification information determination unit 203.

The identification information determination unit 203 is provided in the work vehicle 1. The identification information determination unit 203 determines whether or not identification information acquired by the battery identification information acquisition unit 202 matches identification information of the battery 5 that is provided in the vehicle body. Specifically, the identification information determination unit 203 acquires the battery 5 identification information that was acquired from the charging device 201A by the battery identification information acquisition unit 202 and the unique identification information that is set in the battery 5. The identification information determination unit 203 then determines whether or not the two pieces of identification information match each other. A determination result from the identification information determination unit 203 is transmitted to a later-described permission unit 204.

The permission unit 204 is provided in the work vehicle 1. In the case where the identification information determination unit 203 determines that the two pieces of identification information match each other, the permission unit 204 permits the charging device 201A to charge the battery 5. Specifically, if the identification information determination unit 203 has determined that the identification information set in the charging device 201A in advance matches the identification information of the battery 5 provided in the vehicle body, the permission unit 204 permits the charging of the battery 5. The battery 5 is thus charged.

According to this configuration, it is possible to prevent the risk of the battery 5 being charged with unsuitable specifications. Also, even if the work vehicle 1 is stolen for example, the battery 5 cannot be charged at the thief's destination, thus making it possible to hinder usage of the work vehicle 1 at the thief's destination. Accordingly, it is possible to prevent theft of the work vehicle 1.

In the first embodiment described above, it is described that the work vehicle 1 is driven by the motors 4, but the work vehicle 1 can also be driven by an engine, and furthermore can also be driven by both the motors 4 and an engine.

Although it is described that the battery identification information acquisition unit 202, the identification information determination unit 203, and the permission unit 204 are provided in the work vehicle 1 in the first embodiment described above, there is no limitation to this embodiment. For example, the battery identification information acquisition unit 202, the identification information determination unit 203, and the permission unit 204 may all be provided in the base station 100, or at least some of them may be provided in the base station 100.

Second Embodiment

Figure 8:
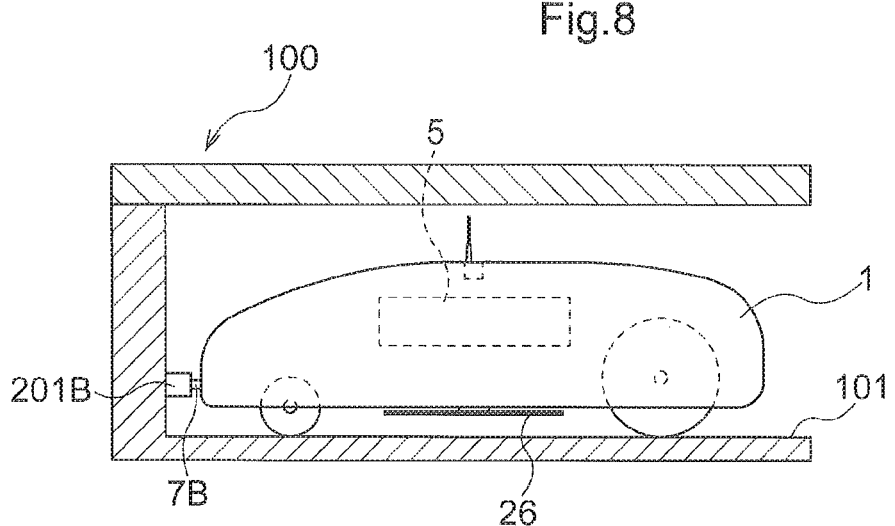
FIG. 8 is a diagram illustrating battery charging.

The base station 100 according to the present invention is configured such that the maintenance of a work vehicle can be performed easily. After work performed by the autonomously-traveling work vehicle ends, the work vehicle returns to the base station 100. FIG. 8 shows an aspect of the charging of the battery 5 of the work vehicle 1. As shown in FIG. 8, the base station 100 is provided with a connection terminal 201B that can be connected to a charging terminal 7B provided in the front end portion of the work vehicle 1. When the work vehicle 1 enters the base station 100 from the front side in the traveling direction, the charging terminal 7B and the connection terminal 201B become connected to each other. When the charging terminal 7B and the connection terminal 201B become connected to each other, the base station 100 detects the stored power amount of the battery 5 via the connection terminal 201B, and charges the battery 5 if the stored power amount is less than or equal to a predetermined amount. Note that the charging terminal 7B shown in FIG. 8 may be the same as the connection terminal 7A shown in FIG. 7. Also, the connection terminal 201B shown in FIG. 8 may be the same as the charging device 201A shown in FIG. 7.

Figure 9:
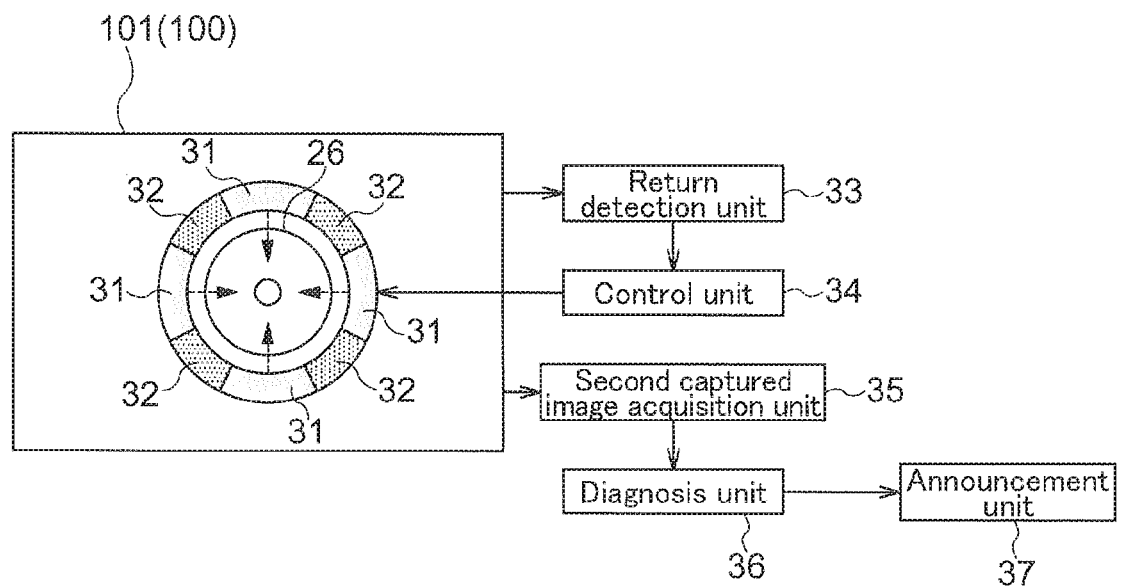
FIG. 9 is a diagram showing a configuration of a base station.

FIG. 9 shows a plan view of a grounding surface 101 to which the wheels 2 of the work vehicle 1 are grounded at the base station 100, and also shows a schematic view of the base station 100. As shown in FIG. 9, the base station 100 includes a shower unit 31, an air blower unit 32, a return detection unit 33, a control unit 34, a second captured image acquisition unit 35, a diagnosis unit 36, and an announcement unit 37.

The shower unit 31 sprays water onto the mowing apparatus 25 that is provided in the work vehicle 1 and performs lawn mowing. As previously described, the mowing apparatus 25 is provided on the bottom surface of the chassis 3 of the work vehicle 1. The shower unit 31 is provided facing upward on the grounding surface 101 so as to be able to spray water from the grounding surface 101 of the base station 100 toward the mowing apparatus 25. Accordingly, it is possible to wash off grass, dirt, and the like that is affixed to the mowing blade 26 of the mowing apparatus 25. Note that due to the work vehicle 1 being sprayed with water from the shower unit 31, it is desirable that the units (e.g., electrical units) of the work vehicle 1 have high water resistance.

The air blower unit 32 blows air onto the mowing apparatus 25 after water is sprayed by the shower unit 31. It is possible that water will adhere to (remain on) the mowing apparatus 25 (particularly the mowing blade 26) that was sprayed with water by the shower unit 31, and leaving such water causes rusting and makes it easier for dust to become affixed. In view of this, the air blower unit 32 is provided facing upward on the grounding surface 101 so as to be able to blow air from the grounding surface 101 of the base station 100 toward the mowing apparatus 25. Accordingly, the air blower unit 32 can dry the mowing blade 26 of the mowing apparatus 25.

Here, the mowing blade 26 has a circular shape when viewed from above. In view of this, as shown in FIG. 9, a configuration is possible in which a plurality of shower units 31 and a plurality of air blower units 32 are alternatingly arranged coaxially with the mowing blade 26 so as to together form a single circular shape. This therefore prevents cases where some portions are not washed or are not dried. Of course, a configuration is possible in which the shower unit 31 forms a circular shape on its own, and the air blower unit 32 forms a circular shape on its own inward or outward of the shower unit 31 in the diameter direction.

The return detection unit 33 detects the return of the work vehicle 1 to the base station 100. The return of the work vehicle 1 refers to the case where the work vehicle 1 has ended lawn mowing and has returned to a preset park position in the base station 100. The return detection unit 33 detects that the work vehicle 1 has returned to the park position. This return can be detected based on the fact that the charging terminal 7B of the work vehicle 1 and the connection terminal 201B of the base station 100 have become connected as described above, for example. Of course, the return can be detected using another method (e.g., can be detected based on a switch being pressed by a wheel 2 upon returning, or can be detected using image recognition). The detection result from the return detection unit 33 is transmitted to the later-described control unit 34.

The control unit 34 controls the operations of the shower unit 31 and the air blower unit 32 such that the shower unit 31 and the air blower unit 32 immediately clean the mowing apparatus 25 when the return of the work vehicle 1 is detected by the return detection unit 33. The detection result from the return detection unit 33 is transmitted to the control unit 34. If the detection result indicates the return of the work vehicle 1 to the base station 100, the control unit 34 instructs the shower unit 31 to spray water onto the mowing apparatus 25. Furthermore, after the shower unit 31 has stopped spraying water, the control unit 34 instructs the air blower unit 32 to blow air onto the mowing apparatus 25. Accordingly, the mowing apparatus 25 is automatically cleaned when the work vehicle 1 returns to the base station 100.

The second captured image acquisition unit 35 acquires captured images of the mowing apparatus 25 of the work vehicle 1 that has returned to the base station 100. The captured images acquired by the second captured image acquisition unit 35 are used in order to check the condition of the mowing apparatus 25 as will be described later. For this reason, it is desirable that a camera (not shown) is provided so as to capture images of the mowing apparatus 25 from a position looking upward from the grounding surface 101, and the second captured image acquisition unit 35 acquires captured images from the camera. The captured images may be still images, or may be moving images. The captured images acquired by the second captured image acquisition unit 35 are transmitted to the later-described diagnosis unit 36.

The diagnosis unit 36 performs diagnosis on a constituent component of the mowing apparatus 25 that possibly requires replacement, based on a captured image acquired by the second captured image acquisition unit 35. Captured images acquired by the second captured image acquisition unit 35 are transmitted to the diagnosis unit 36, and the captured images show the mowing apparatus 25 as viewed from the grounding surface 101. The diagnosis unit 36 performs image recognition processing based on the captured images, and determines whether or not a component has become damaged or has deteriorated. Specifically, for example, the diagnosis unit 36 determines whether or not the housing of the mowing apparatus 25 has become damaged or dented, and determines whether or not the mowing blade 26 has become damaged or worn. The diagnosis unit 36 compares the captured images received from the second captured image acquisition unit 35 with replacement limit images that show replacement limit states of corresponding components, and determines that a component requires replacement if that component has deteriorated (is worn or damaged) beyond the replacement limit state. Determination results from the diagnosis unit 36 are transmitted to the later-described announcement unit 37.

The announcement unit 37 announces a determination result from the diagnosis unit 36 to the user. A determination result from the diagnosis unit 36 is transmitted to the announcement unit 37. The announcement unit 37 makes an announcement to the user if the determination result from the diagnosis unit 36 indicates that a component requires replacement. The announcement made by the announcement unit 37 may be an announcement made directly to the user, or may be an announcement made through a notification given to a terminal (e.g., a terminal 70 shown in FIG. 15) in the possession of the user. The announcement unit 37 may also output audio, and may output light. Of course, the announcement unit 37 may also make the announcement using both audio and light. A configuration is also possible in which the announcement gives specific information regarding the component that requires replacement.

According to this configuration, even in the case of a component that is difficult for the user to see, such as the mowing apparatus 25 arranged on the bottom face of the work vehicle 1 for example, the user can become aware of a component that requires replacement through an automatic announcement that is made when the work vehicle 1 returns to the base station 100.

Figure 10:
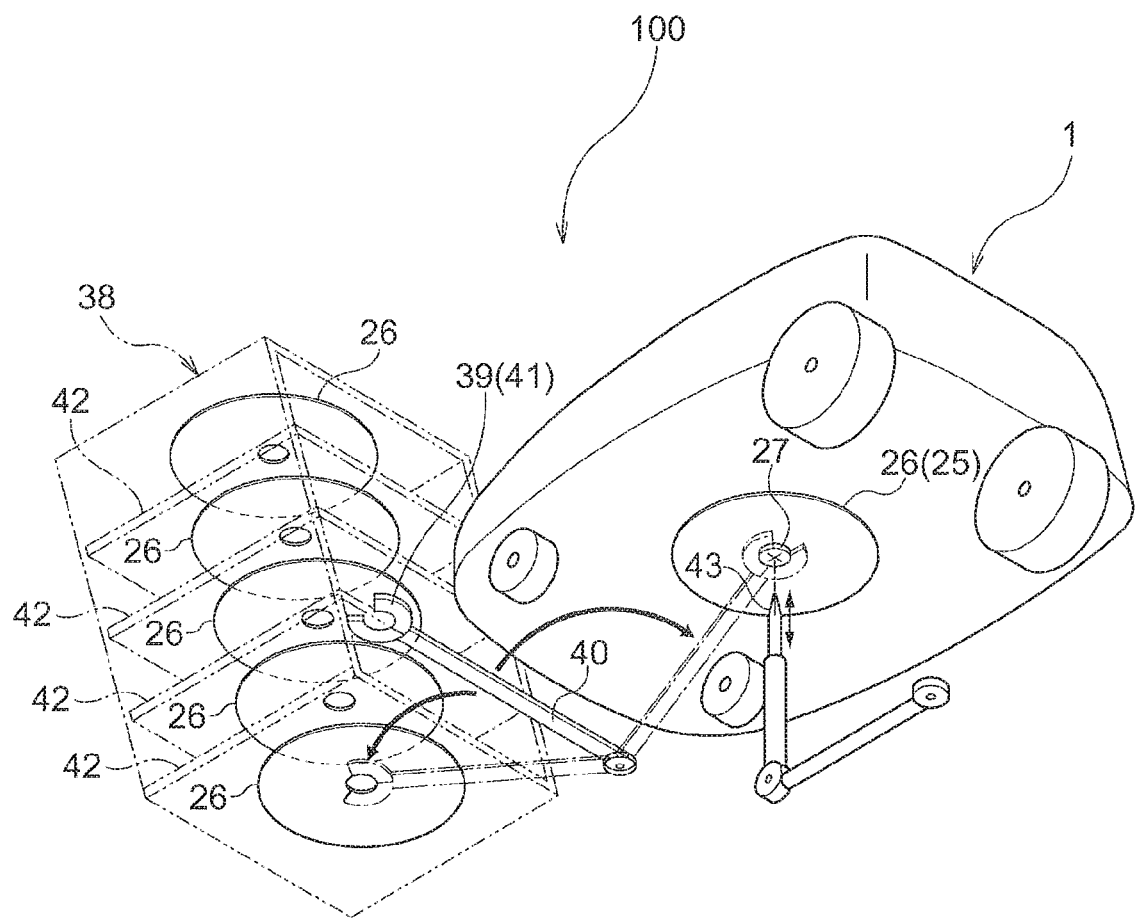
FIG. 10 is a diagram illustrating mowing blade replacement.

Here, upon receiving the announcement that a component requires replacement as described above, the user may replace the component on their own, but in the case of the work vehicle 1 that performs lawn mowing, the mowing blade 26 often becomes worn and requires replacement. In view of this, the base station 100 of the second embodiment is configured to be capable of automatically replacing the mowing blade 26. FIG. 10 is a schematic diagram showing an aspect of such replacement of the mowing blade 26.

As shown in FIG. 10, the base station 100 includes a storage unit 38, a removal unit 39, a transport unit 40, and an attachment unit 41.

The storage unit 38 stores a constituent component of the mowing apparatus 25. In the second embodiment, this constituent component of the mowing apparatus 25 is the mowing blade 26. Of course, the storage unit 38 can also store components other than the mowing blade 26. In the example in FIG. 10, the storage unit 38 stores a stack of mowing blades 26 that are placed on trays 42.

When the diagnosis unit 36 has determined that a component requires replacement, the removal unit 39 removes the component from the mowing apparatus 25. In the second embodiment, the component that the diagnosis unit 36 has determined to require replacement is the mowing blade 26. The removal unit 39 removes the mowing blade 26 from the mowing apparatus 25 of the work vehicle 1 that has returned to the base station 100. Here, the mowing blade 26 rotates about a rotation shaft during lawn mowing. In the second embodiment, the mowing blade 26 is fixed by being fastened to the rotation shaft with use of a screw 27. In view of this, when the diagnosis unit 36 determines that the mowing blade 26 requires replacement, a drill 43 having a torque limiter function appears in the base station 100, and the removal unit 39 rotates (loosens) the screw 27 while supporting the mowing blade 26. When the drill 43 finishes loosening the screw 27, the drill 43 descends, and at the same time, the removal unit 39 removes the mowing blade 26 that was determined to require replacement from the mowing apparatus 25.

The transport unit 40 transports a removed component to the storage unit 38. The removed component is the mowing blade 26 that was removed from the mowing apparatus 25 by the removal unit 39. The removed mowing blade 26 is transported to the storage unit 38 by the transport unit 40. In the second embodiment, the transport unit 40 is constituted by an arm unit. This arm unit transports the mowing blade 26 between the work vehicle 1 and the storage unit 38 by rotating about a predetermined rotation shaft. The mowing blade 26 that was removed from the mowing apparatus 25 is placed on a tray 42, and then moved to and stored at a predetermined position (used mowing blade location) in the storage unit 38. Note that the movement of trays 42 in the storage unit 38 and a mechanism for such movement are not shown in FIG. 10.

Next, the transport unit 40 transports a replacement component for the removed component from the storage unit 38 to the mowing apparatus 25. The replacement component for the removed component is an unused mowing blade 26. The transport unit 40 retrieves a tray 42 loaded with an unused mowing blade 26 from the storage unit 38, and transports the tray 42 to the mowing apparatus 25. Accordingly, the unused mowing blade 26 can be transported to the work vehicle 1. Note that the transport unit 40 may be configured to select and retrieve an unused component from the storage unit 38. Also, the transport unit 40 may be configured such that when a used component is placed at a predetermined position (e.g., the highest level) in the storage unit 38, an unused component appears at another predetermined position (e.g., the lowest level) in the storage unit 38 that is different from the aforementioned predetermined position.

The attachment unit 41 attaches a component that was transported from the storage unit 38 to the mowing apparatus 25. The component that was transported from the storage unit 38 is an unused mowing blade 26. The attachment unit 41 waits at a mowing blade 26 attachment position of the mowing apparatus 25 while supporting the unused mowing blade 26. Then the drill 43 rises and tightens the screw 27 until a limit torque is reached, and thus the unused mowing blade 26 is fixed by being fastened to the rotation shaft of the mowing apparatus 25. Accordingly, if the mowing blade 26 has become worn, the mowing blade 26 is automatically replaced with an unused mowing blade. It is preferable that the attachment unit 41 is configured to confirm that the mowing blade 26 has been appropriately attached based on the operation of the torque limiter and image diagnosis. Note that although the removal unit 39 and the attachment unit 41 are constituted by the same component in the example shown in FIG. 10, these units may be constituted by separate components.

Note that a configuration is preferable in which, in such a case where the mowing blade 26 is replaced automatically, the attachment unit 41 transmits replacement information (information indicating that the mowing blade 26 of the mowing apparatus 25 was replaced) to the announcement unit 37, and the announcement unit 37 announces the replacement information to the user. Accordingly, the user can retrieve the used mowing blade 26 from the storage unit 38 and add an unused mowing blade 26.

In the second embodiment described above, it is described that the second captured image acquisition unit 35 acquires a captured image that shows the mowing apparatus 25 of the work vehicle 1 that has returned to the base station 100, and the diagnosis unit 36 determines a constituent component of the mowing apparatus 25 that requires replacement based on the captured image, but there is no limitation to this embodiment. For example, a configuration is possible in which the second captured image acquisition unit 35 and the diagnosis unit 36 are not provided in the base station 100. In this case, a configuration is possible in which the announcement unit 37 is also not provided in the base station 100.

In the second embodiment described above, the base station 100 includes the storage unit 38, the removal unit 39, the transport unit 40, and the attachment unit 41 in order to perform a series of tasks for replacing a component that was determined to require replacement by the diagnosis unit 36, but there is no limitation to this embodiment. In the case where the replacement of a component determined to require replacement is performed by the user for example, a configuration is possible in which the storage unit 38, the removal unit 39, the transport unit 40, and the attachment unit 41 are not provided in the base station 100.

In the second embodiment described above, it is described that the announcement unit 37 announces, to the user, replacement information that indicates that a component of the mowing apparatus 25 was replaced, but a configuration is possible in which the announcement unit 37 does not announce the replacement information to the user.

Third Embodiment

Figure 11:
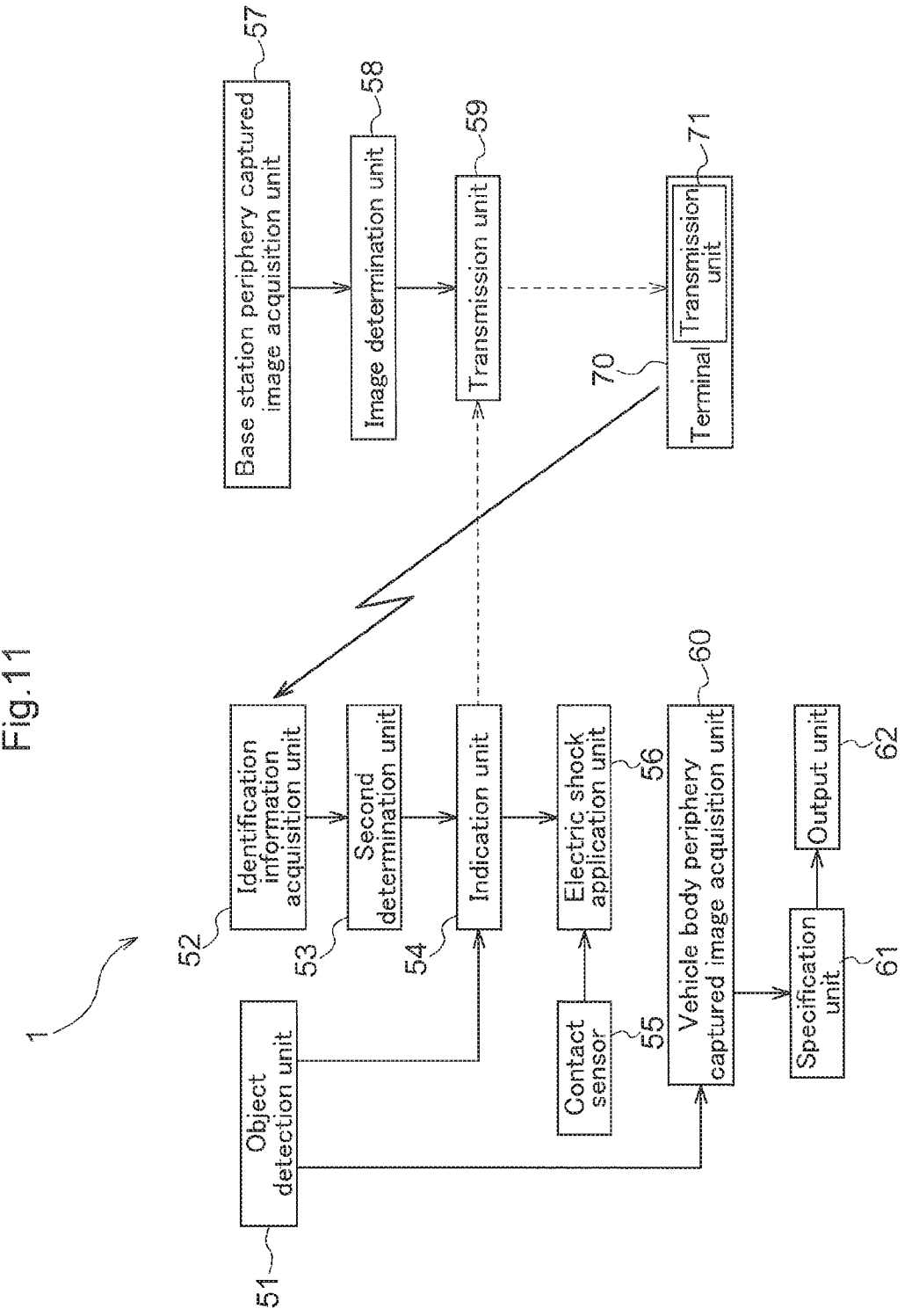
FIG. 11 is a block diagram schematically showing a configuration of a work vehicle.

The work vehicle 1 according to the present invention is configured to be resistant to theft. FIG. 11 is a block diagram schematically showing a configuration of the work vehicle 1. The work vehicle 1 includes function units such as an object detection unit 51, an identification information acquisition unit 52, a second determination unit 53, an indication unit 54, a contact sensor 55, an electric shock application unit 56, a base station periphery captured image acquisition unit 57, an image determination unit 58, a transmission unit 59, a vehicle body periphery captured image acquisition unit 60, a specification unit 61, and an output unit 62. For performing various types of processing pertaining to preventing theft of the work vehicle 1, these function units are constructed from hardware including a CPU as a central member, are constructed from software, or are constructed from both.

The object detection unit 51 detects an object that is located in the periphery of the vehicle body. The periphery of the vehicle body is the periphery of the work vehicle 1. The concept of the "object" includes not only a moving object such as a person or an animal, but also a stationary object. The object detection unit 51 that detects such an object is preferably configured to include a known ultrasonic sensor, sonar, or the like. Of course, the object detection unit 51 may be configured to include an image capturing device such as a camera. Detection results from the object detection unit 51 are transmitted to the later-described indication unit 54.

A transmission unit 71 of the terminal 70 in the possession of the user transmits identification information to the surrounding area, and the identification information acquisition unit 52 acquires the identification information. The user is the person who owns and uses the work vehicle 1. The terminal 70 corresponds to a smart key or a remote controller that is used to start up the work vehicle 1. Identification information that is in one-to-one correspondence with the work vehicle 1 is stored in the terminal 70 in advance, and the transmission unit 71 of the terminal 70 transmits the identification information to the surrounding area. The identification information acquisition unit 52 acquires the identification information that was transmitted by the transmission unit 71. The identification information acquired by the identification information acquisition unit 52 is transmitted to the later-described second determination unit 53.

The second determination unit 53 determines whether or not the identification information acquisition unit 52 acquired preset identification information that is associated with the vehicle body. Here, the "preset identification information that is associated with the vehicle body" is the identification information that is stored in the terminal 70. The identification information stored in the terminal 70 is in one-to-one correspondence with the work vehicle 1 that includes the identification information acquisition unit 52. The second determination unit 53 determines whether or not the identification information acquisition unit 52 acquired such identification information. The determination result from the second determination unit 53 is transmitted to the later-described indication unit 54.

In the case where the second determination unit 53 determined that the identification information acquisition unit 52 did not acquire the preset identification information, and furthermore the distance from the vehicle body to the object is within a preset distance, the indication unit 54 gives an indication that the object has approached the vehicle body. The "case where the second determination unit 53 determined that the identification information acquisition unit 52 did not acquire the preset identification information" corresponds to a case where the identification information acquired by the identification information acquisition unit 52 is different from the preset identification information, and a case where the identification information acquisition unit 52 has not acquired any identification information whatsoever. This is specified based on a determination result from the second determination unit 53. The "case where the distance from the vehicle body to the object is within a preset distance" refers to a case where the object has approached the vehicle body, and this can be specified based on a detection result from the object detection unit 51. The preset distance can be set to one meter for example, and can also be set by the user as necessary.

Accordingly, in the case where the identification information acquired by the identification information acquisition unit 52 is different from the preset identification information, or the identification information acquisition unit 52 has not received any identification information whatsoever, and furthermore an object has approached the vehicle body, the indication unit 54 indicates that the object has approached the vehicle body. This indication may be realized by, for example, operating a buzzer of the work vehicle 1, or lighting or flashing an illumination device such as a light or a lamp.

Figure 12:
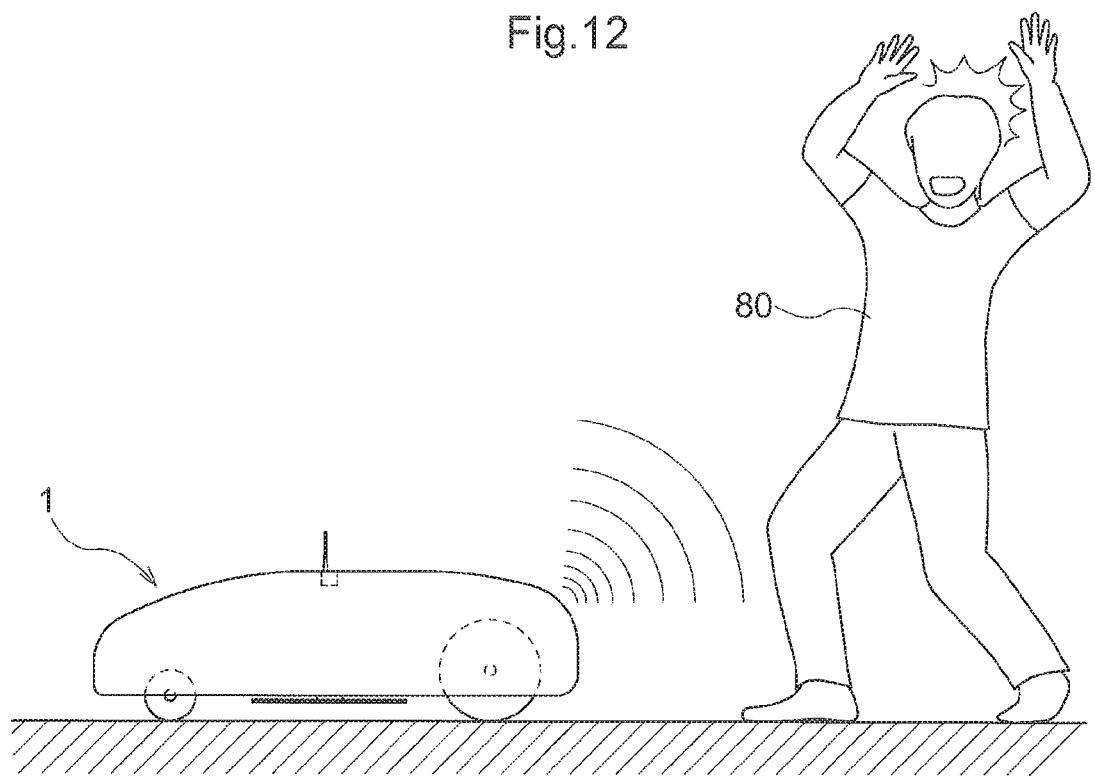
FIG. 12 is a schematic diagram illustrating an indication given by an indication unit.

According to this configuration, as shown in FIG. 12, if a person 80 (unauthorized person 80) different from the user of the work vehicle 1 has approached the work vehicle 1 (has moved within a preset range), it is possible to give a warning by operating a warning buzzer or the like so as to inform the person who is not the user that the work vehicle 1 is located nearby, or so as to warn the person 80 and prevent theft.

The contact sensor 55 is provided in the vehicle body and detects contact with an object. Here, "provided in the vehicle body" refers to being provided in the work vehicle 1 described above. Also, "detects contact with an object" refers to detecting whether or not the work vehicle 1 was touched. The contact sensor 55 may be constituted by, for example, a capacitive sensor that performs detection based on a change in electrostatic capacitance, or a load sensor that performs detection based on a change in load. A detection result from the contact sensor 55 is transmitted to the later-described electric shock application unit 56.

In the case where the indication unit 54 has given an indication, and furthermore the contact sensor 55 detected that the vehicle body was touched by the object, the electric shock application unit 56 applies an electric shock to the object that is touching the vehicle body. The "case where the indication unit 54 has given an indication" refers to the case where the indication unit 54 has given an indication when the identification information acquired by the identification information acquisition unit 52 is different from the preset identification information, or the identification information acquisition unit 52 has not received any identification information whatsoever, and furthermore an object has approached the vehicle body. It is preferable that in the case where the indication unit 54 has given an indication, the indication unit 54 transmits information to that effect to the electric shock application unit 56. The case where "the contact sensor 55 detected that the vehicle body was touched by the object" can be specified based on a detection result from the contact sensor 55. In such a case, the electric shock application unit 56 applies an electric shock to the object that is touching the vehicle body. It is preferable that the electric shock is set to a strength according to which the object realizes that it has touched the vehicle body, but the user can change the strength as necessary. Specifically, it is preferable that the strength is set such that even if the voltage value is high (e.g., 10,000 volts), the current value of the current that flows to the object is small, as with static electricity.

Figure 13:
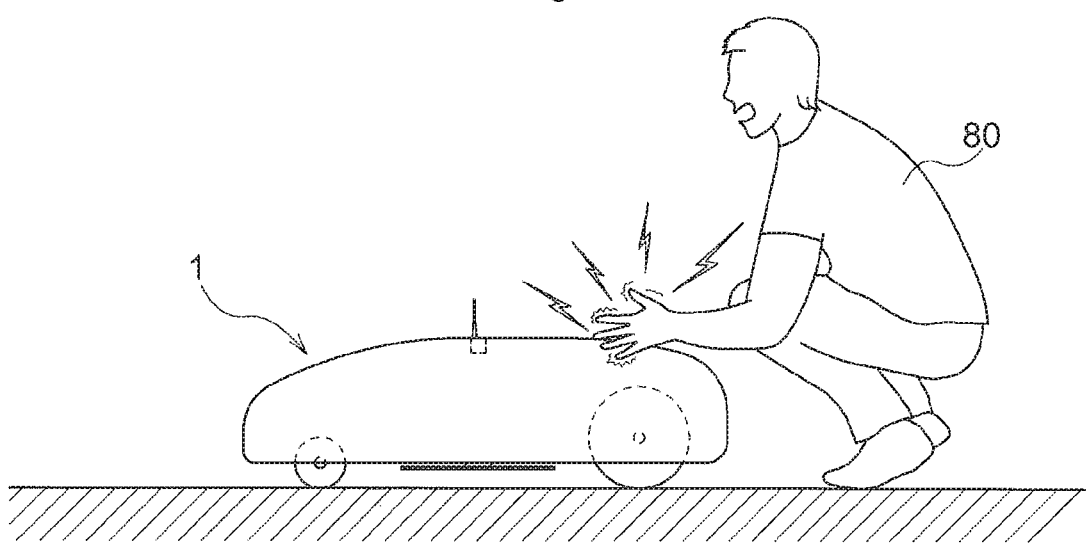
FIG. 13 is a schematic diagram showing the application of an electric shock by an electric shock application unit.

According to this configuration, as shown in FIG. 13, if the object (person 80) ignores the above-described warning (indication) given by the indication unit 54 and touches the vehicle body, it is possible to apply an electric shock equivalent to a static shock so as to stop the object from touching the work vehicle 1, thus preventing theft.

Here, the work vehicle 1 performs lawn mowing while traveling autonomously, and it is configured so as to depart from the base station 100 at a work start time (see FIGS. 7, 8, and 14) and return to the base station 100 after work ends. In the configuration of the third embodiment, resistance to theft is achieved even when the work vehicle 1 is parked in the base station 100. Specifically, as shown in FIG. 15, the base station periphery captured image acquisition unit 57 that acquires a captured image showing the periphery of the base station 100 is provided at a location separated from the base station 100 to which the work vehicle autonomously returns. The base station 100 to which the work vehicle autonomously returns corresponds to a garage in which the work vehicle 1 parks when not performing work. In the third embodiment, the work vehicle 1 is driven with use of electric power that is stored in the battery 5, as described above. For this reason, the base station 100 is provided with the charging device 201A (e.g., see FIG. 7) that can charge the battery 5.

A captured image acquired by the base station periphery captured image acquisition unit 57 is captured so as to include the base station 100 and the periphery of the base station 100 in order to be able to detect an object that is approaching the base station 100. Accordingly, the base station periphery captured image acquisition unit 57 is provided at a location separated from the base station 100 (e.g., on the user's house). The captured images acquired by the base station periphery captured image acquisition unit 57 are transmitted to the later-described image determination unit 58.

The image determination unit 58 determines whether or not an object is included in a captured image acquired by the base station periphery captured image acquisition unit 57. As described above, a captured image acquired by the base station periphery captured image acquisition unit 57 is transmitted to the image determination unit 58. The object is an object that is approaching the base station 100. In other words, it is desirable to exclude stationary objects located in the periphery of the base station 100. The image determination unit 58 uses the captured image and known image recognition processing to determine whether or not an object approaching the base station 100 is included in the captured image. Specifically, it is preferable to determine whether or not an object is approaching the base station 100 with use of a plurality of captured images as in an optical flow for example. The determination result from the image determination unit 58 is transmitted to the later-described transmission unit 59.

In the case where the image determination unit 58 determined that an object is included in the captured image, and furthermore the indication unit 54 has given an indication, the transmission unit 59 transmits, to the user's terminal 70, information indicating that there is an object that is approaching the vehicle body. The determination result indicating whether or not an object is included in the captured image is transmitted from the image determination unit 58 to the transmission unit 59. Information indicating that the indication unit 54 gave an indication is also transmitted from the indication unit 54 to the transmission unit 59. The "information indicating that there is an object that is approaching the vehicle body" may be realized by a message that indicates the approach of an object being displayed on the display screen of the terminal 70, or may be realized by flashing a lamp (e.g., an LED), for example. When the transmission unit 59 acquires the determination result from the image determination unit 58 indicating that an object is included in the captured image and the information indicating that the indication unit 54 gave an indication, the transmission unit 59 transmits, to the user's terminal 70, information indicating that there is an object that is approaching the work vehicle 1.

Figure 14:
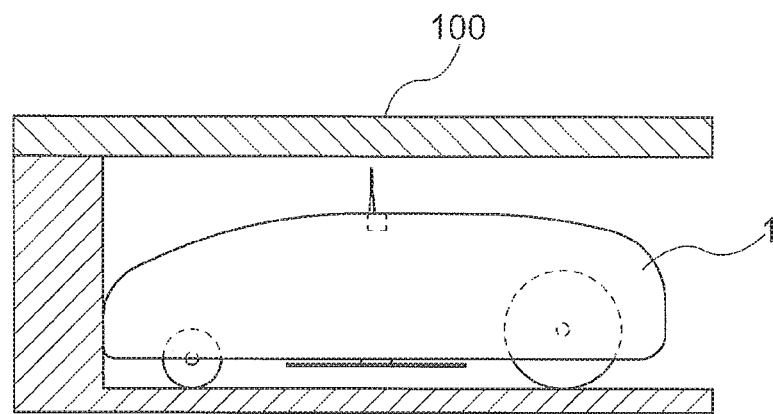
FIG. 14 is a diagram showing a state in which the work vehicle is parked at the base station.
Figure 15:
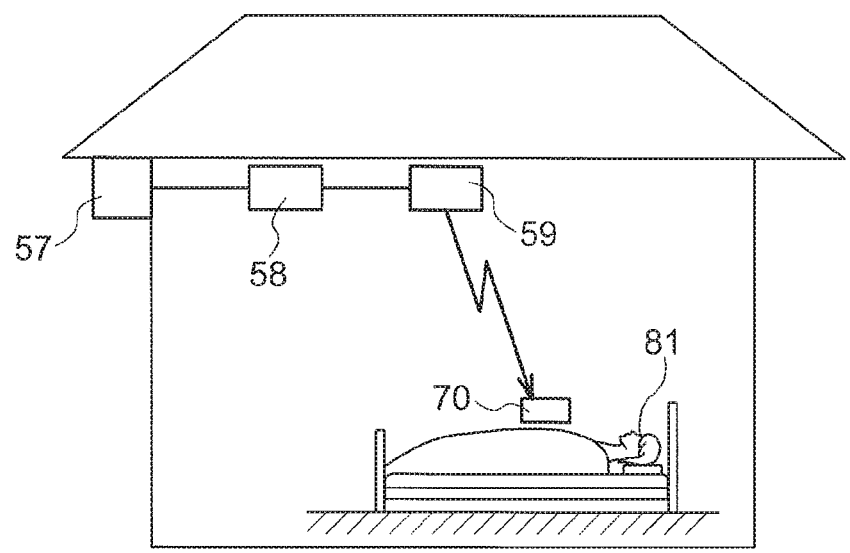
FIG. 15 is a schematic diagram illustrating transmission to a terminal.

According to this configuration, even when the work vehicle 1 is parked in the base station 100 as shown in FIGS. 7, 8, and 14, it is possible to monitor the work vehicle 1 and inform a user 81 that there is an object that is approaching the work vehicle 1 as shown in FIG. 15.

Returning to FIG. 11, the vehicle body periphery captured image acquisition unit 60 acquires a captured image that shows the surroundings of the vehicle body. The captured images showing the surroundings of the vehicle body are images that show the periphery as viewed from the work vehicle 1. For example, a configuration is possible in which at least one camera is provided in any of the front end portion, the rear end portion, and the left and right side end portions of the work vehicle 1, and the aforementioned captured image is acquired through the surroundings being imaged by the camera (cameras). The captured images may be still images, or may be moving images. The vehicle body periphery captured image acquisition unit 60 may be configured to acquire a captured image if an object was detected by the object detection unit 51, or may be configured to acquire captured images at all times, for example. The captured images acquired by the vehicle body periphery captured image acquisition unit 60 are transmitted to the later-described specification unit 61.

The specification unit 61 specifies an object that is approaching the vehicle body based on a captured image acquired by the vehicle body periphery captured image acquisition unit 60. For example, the specification unit 61 may store in advance reference images that enable pattern recognition for various persons and animals that can possibly be at the work site where the work vehicle 1 performs work or at the base station 100 where the work vehicle 1 parks. It is preferable that the specification unit 61 specifies the object included in the captured image by performing pattern recognition between the object included in the captured image and the reference images. Such pattern recognition can be performed using known image recognition processing and therefore will not be described. A detection result from the specification unit 61 is transmitted to the later-described output unit 62.

Based on the specified object, the output unit 62 outputs a retreat sound for causing the object to retreat. The object is specified by the specification unit 61 as described above. The retreat sound for causing the object to retreat is a sound that is disliked by the object. For example, if the object is a young child, the retreat sound may be a high frequency sound that is generally not readily audible to adults, and if the object is an adult, the retreat sound may be an alarm such as a siren. Also, if the object is an animal, the output unit 62 may output ultrasound that is disliked by the animal. The output of such a retreat sound by the output unit 62 makes it possible to prevent the object from approaching the work vehicle 1.

In the third embodiment described above, it is described that the work vehicle 1 includes the contact sensor 55 and the electric shock application unit 56, but a configuration is possible in which the contact sensor 55 and the electric shock application unit 56 are not provided in the work vehicle 1. Also, instead of the electric shock application unit 56, the work vehicle 1 may include another mechanism unit by which the object touching the vehicle body is informed that it is touching the vehicle body.

In the third embodiment described above, it is described that the work vehicle 1 includes the base station periphery captured image acquisition unit 57, the image determination unit 58, and the transmission unit 59, but a configuration is possible in which the base station periphery captured image acquisition unit 57, the image determination unit 58, and the transmission unit 59 are not provided in the work vehicle 1.

In the third embodiment described above, it is described that the work vehicle 1 includes the vehicle body periphery captured image acquisition unit 60, the specification unit 61, and the output unit 62, but a configuration is possible in which the vehicle body periphery captured image acquisition unit 60, the specification unit 61, and the output unit 62 are not provided in the work vehicle 1.

In the third embodiment described above, it is described that the output unit 62 outputs a retreat sound for causing an object to retreat based on the specified object. Here, the vehicle body includes the mowing apparatus 25 as a work unit that performs work on a work target as described above, and the retreat sound can be generated using the operation sound produced when the work unit operates. In this case, the operation sound can be generated in accordance with the size and shape of the opening portion (window portion) of the work unit, or the operation sound can be generated in accordance with the shape of the mowing blade 26.

Although it is described that the work performed on the work target is lawn mowing in the first embodiment, the second embodiment, and the third embodiment described above, the work may be another type of work.

What is claimed is:

1. A work vehicle that performs work while traveling autonomously, comprising:
   an object detection unit configured to detect an object located in a periphery of a vehicle body;
   an identification information acquisition unit configured to acquire identification information that is transmitted from a transmission unit of a terminal in possession of a user to the periphery;
   a second determination unit configured to determine whether or not the identification information acquisition unit acquired preset identification information that is associated with the vehicle body;
   an indication unit configured to give an indication that the object is approaching the vehicle body in a case where the identification information acquisition unit determined that the preset identification information has not been acquired and furthermore a distance from the vehicle body to the object is within a preset distance;
   a vehicle body periphery captured image acquisition unit configured to acquire a captured image that shows surroundings of the vehicle body;
   a specification unit configured to specify an object approaching the vehicle body based on the captured image acquired by the vehicle body periphery captured image acquisition unit; and
   an output unit configured to output a retreat sound for causing the object to retreat, using different sounds for each object specified by the specification unit,
   wherein the object detection unit is at least one of an ultrasonic sensor, a sonar system, and a camera,
   wherein the vehicle body periphery captured image acquisition unit is a camera, and
   wherein the output unit is a speaker.

2. The work vehicle according to claim 1, further comprising:
   a contact sensor that is provided in the vehicle body and is configured to detect contact by the object.

3. The work vehicle according to claim 1, further comprising:
   a base station periphery captured image acquisition unit that is provided at a location separated from a base station to which the work vehicle returns while traveling autonomously, and is configured to acquire a captured image that shows surroundings of the base station;
   an image determination unit configured to determine whether or not the object is included in the captured image acquired by the base station periphery captured image acquisition unit; and
   a transmission unit configured to transmit, to the terminal of the user, information indicating that there is an object approaching the vehicle body in a case where the image determination unit determined that the object is included in the captured image and furthermore the indication unit gave the indication,
   wherein the base station periphery captured image acquisition unit is a camera.

4. The work vehicle according to claim 1, further comprising:
   a work unit that is provided in the vehicle body and is configured to perform work on a work target;
   wherein the retreat sound is generated with use of an operation sound produced during operation of the work unit, and
   wherein the work unit is a mower unit.

* * * * *